United States Patent [19]

Tribe

[11] 3,950,035

[45] Apr. 13, 1976

[54] RELAY VALVE OPERATED SKID CONTROL SYSTEM

[75] Inventor: Leonard T. Tribe, Ann Arbor, Mich.

[73] Assignee: Kelsey-Hayes Company, Romulus, Mich.

[22] Filed: Oct. 25, 1974

[21] Appl. No.: 517,865

[52] U.S. Cl. ............................................. 303/21 F
[51] Int. Cl.² ........................................ B60T 8/10
[58] Field of Search ............... 188/181 A; 303/21 F

[56] References Cited
UNITED STATES PATENTS
3,823,987  7/1974  Kurichh ........................... 303/21 F

*Primary Examiner*—Duane A. Reger
*Attorney, Agent, or Firm*—Harness, Dickey & Pierce

[57] ABSTRACT

A skid control device for pneumatic brake systems embodying relay valves. In response to an impending skidding condition, the control pressure on the relay valve is dumped to relieve the brake pressure. When the brakes are dumped, a latch valve isolates the operator controlled treadle valve from the relay valve and establishes an alternative actuating path for subsequent brake actuation. A regulator is interposed in this path and provides controlled pressure for subsequent re-applications during a given braking cycle. The regulator is operatively connected with a memory volume to provide a regulated pressure that is related to the pressure that existed at the time the brakes were initially dumped.

24 Claims, 6 Drawing Figures

3,950,035

RELAY VALVE OPERATED SKID CONTROL SYSTEM

BACKGROUND OF THE INVENTION

This invention relates to a vehicular anti skid braking system and particularly to an anti skid braking system for use in pneumatic brakes embodying relay valves.

It is well known that the locking of vehicular wheels during braking action results in a loss of directional control of the vehicle. Various automatic skid control devices have been provided for relieving the brake pressure in response to an incipient skidding condition to prevent or minimize the adverse effects of wheel lockup. Normally these devices include a valve or other structure for isolating the operator applied pressure from the brake actuating mechanism in response to the skid condition. These valves are conventionally rapidly cycled during a given braking operation to successively release and apply the brakes. During the operation of the skid control device, the pressure exerted by the operator on the operator controlled portion of the brake system continues to rise. If this increased pressure is directly transmitted to the brakes on subsequent reapplications during the braking cycle, there is a significantly greater likelihood of wheel lockup during such subsequent applications.

It is, therefore, a principal object of this invention to provide an anti skid braking system that modulates the pressure upon re-applications during a given braking cycle.

It is another object of this invention to provide an anti skid braking system in which the pressure applied to the brakes on subsequent applications during a given braking cycle is reduced to a level that will not promote skidding.

One type of braking system commonly used in tractor trailer type pneumatic brakes embodies a relay valve. Such relay valves have a pilot operated portion that experiences pressure from the operator treadle control and which, in turn, controls the communication between the source of high pressure and the wheel brakes. In connection with this type of braking system, it has been proposed to provide an anti skid by dumping the operator controlled pressure applied to the relay valve to release the brakes and prevent skidding. After the wheels have been permitted to spin up to a certain extent, the brakes are re-applied. If the full treadle pressure is applied to the relay valve the brakes will experience a greater actuating pressure than that which existed at the time the original skidding condition was detected. Thus, on subsequent brake applications the chances of skidding are promoted rather than reduced.

It is, therefore, a further object of this invention to provide an improved skid control system for brakes of the type embodying a relay valve.

It is another object of this invention to provide a relay valve operated skid control system in which subsequent application pressures are modulated to an extent that will not result in skidding.

SUMMARY OF THE INVENTION

This invention is adapted to be embodied in a vehicular anti skid braking system that includes brake applying means and an operator control for selectively applying actuating pressure to the brake applying means for actuating a vehicle brake. Regulator means are incorporated for providing a controlled supply of pressure. Means responsive to an incipient skid condition are provided for relieving the pressure in the brake applying means to prevent skidding. Means are also provided that are responsive to a predetermined condition for thereafter applying pressure from the regulator means to the brake applying means for subsequent application of the brake applying means at a regulated pressure.

BRIEF DESCRIPTION OF THE DRAWINGS

FIG. 1 shows the system in the normal brake applying mode.

FIG. 2 shows the system in the dump mode.

FIG. 3 shows the system in a subsequent re-application mode.

DETAILED DESCRIPTION OF THE PREFERRED EMBODIMENTS

Figure 1:
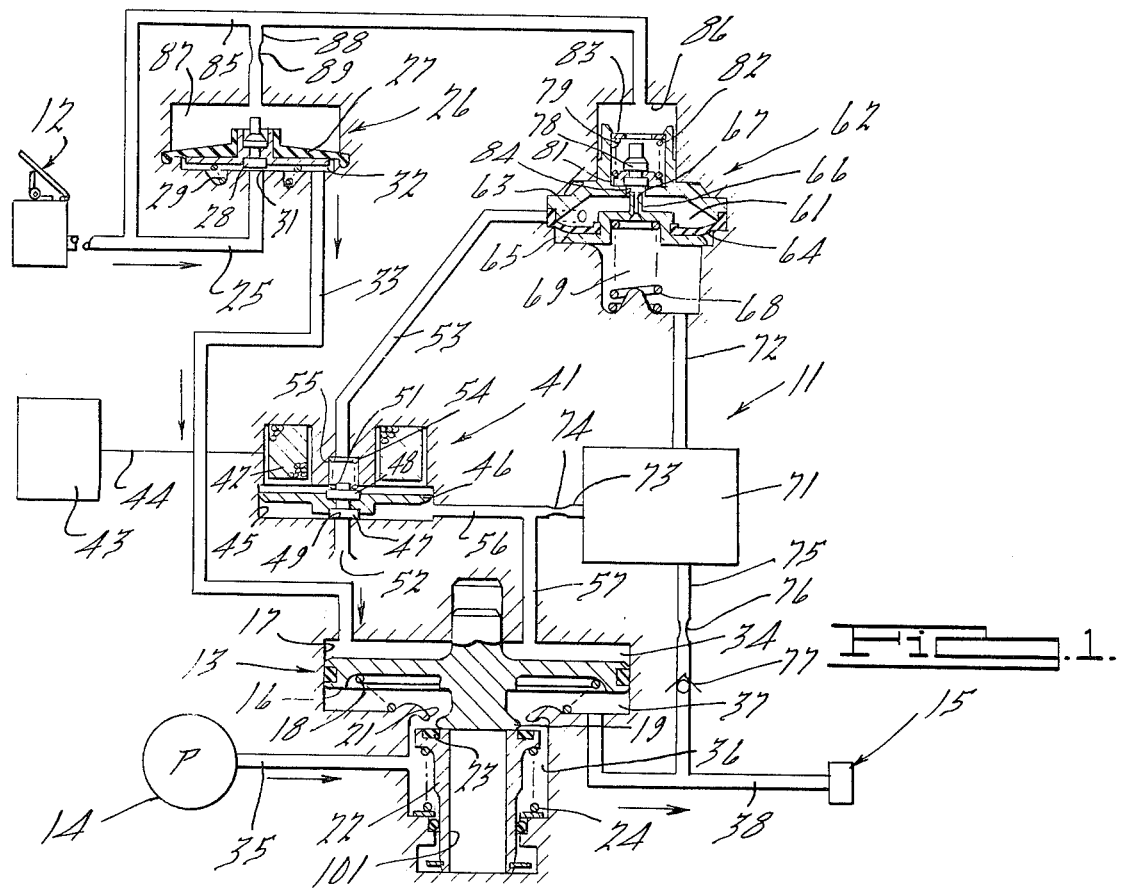
FIGS. 1 through 3 is a partially schematic view of a relay valve operated skid control system embodying this invention.
Figure 2:
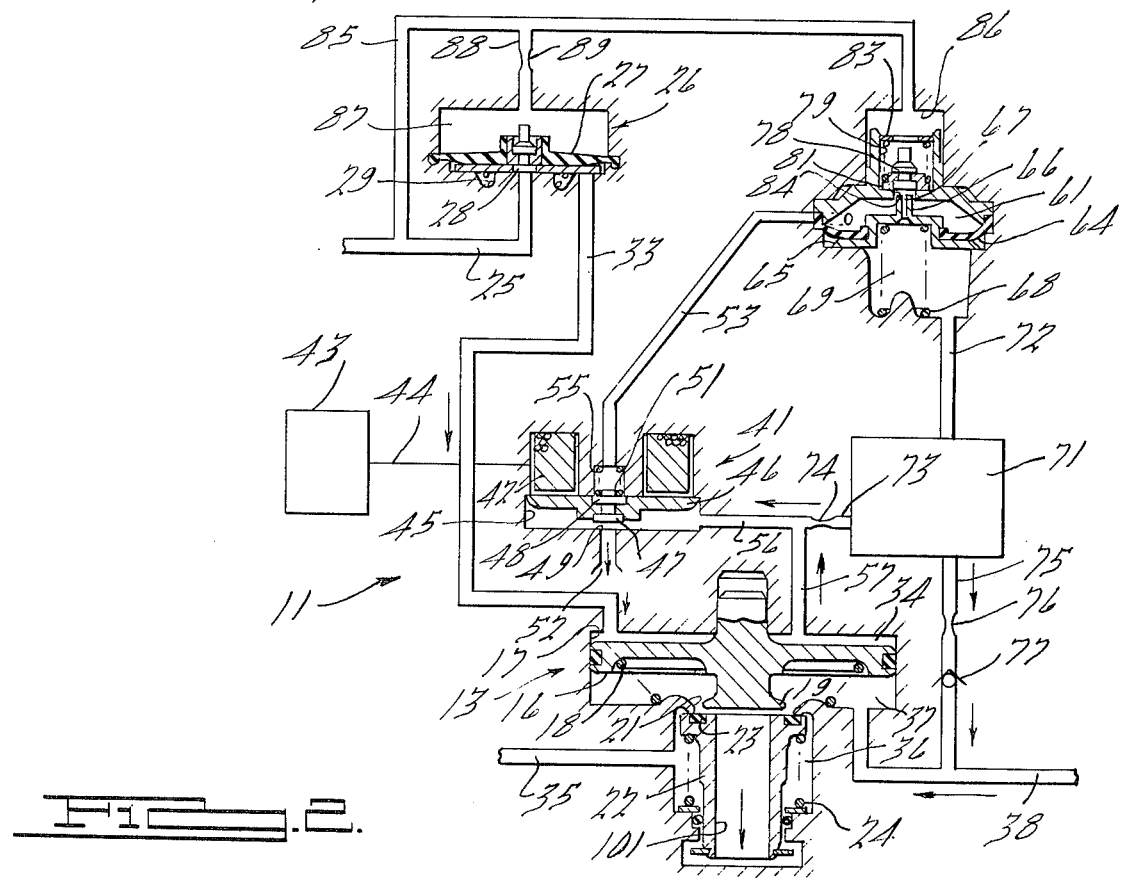
Figure 3:
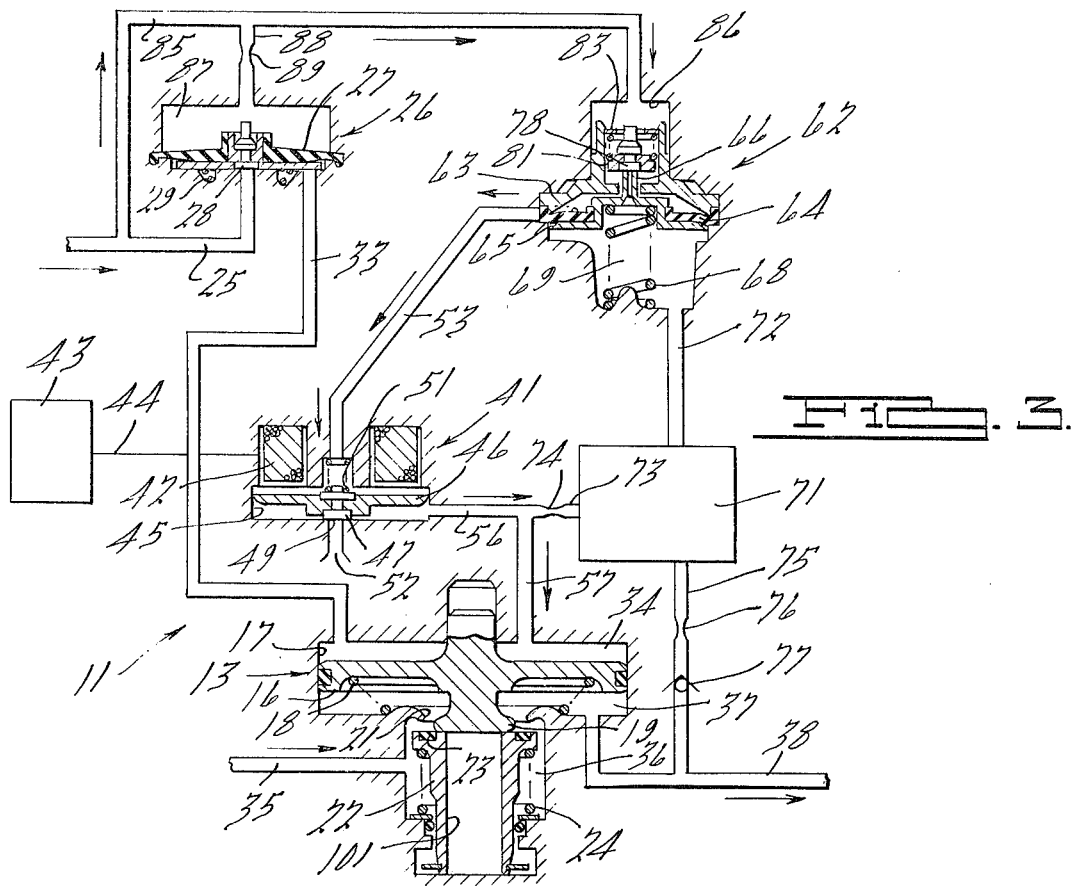

FIGS. 1 through 3 are a schematic illustration of a relay valve skid control brake system embodying this invention in which the system is identified generally by the reference numeral 11. The details of the relay valve and associated components are shown in a physical embodiment in FIGS. 5 and 6. The schematic views, FIGS. 1 through 3, will first be described in detail. In doing so, however, the various components of the valve which also appear in FIGS. 5 and 6 will be identified by the same reference numerals in each of these other figures.

The brake system includes an operator controlled treadle valve 12 that selectively supplies controlled pressure through conduits to be described to a relay valve indicated generally by the reference numeral 13. When the relay valve 13 is actuated, brake actuating pressure is delivered from an appropriate pressure source 14 to one or more wheel brake actuating devices 15 through appropriate conduits.

The relay valve 13 includes a control piston 16 that is slidably supported in a cylinder bore 17 and which is urged to a deactuated position by means of a spring 18. The control piston 16 has a downwardly extending portion 19 that is smaller in diameter than an adjacent valve seat 21. A control valve 22 has a gasketed portion 23 that is, at times, adapted to engage the valve seat 21. The control piston portion 19 is adapted to engage and operate the control valve 22, in a manner which will become apparent. The control valve 22 is normally urged toward a closed position by means of a compression spring 24.

A conduit 25 extends from the treadle valve 12 to a latch valve, indicated generally by the reference numeral 26. The latch valve 26 is comprised of a resilient diaphragm 27 that carries a valve member 28 at its central portion. A spring 29 normally urges the valve member 28 away from closure with a port 31 formed at the termination of the conduit 25. Thus, the conduit 25 may communicate with a chamber 32 formed on the lower side of the diaphragm 27. A conduit 33 extends from the chamber 32 to a chamber 34 formed on the upper side of the control piston 16 in the bore 17. The application of pressure from the treadle valve 12 through the conduit 25 past the open latch valve 26 to the conduit 33 results in pressure being applied to the upper side of the control piston 16. When this pressure exceeds the force of the spring 18, the control piston 16 will move downwardly and urge the control valve 22 to its opened position (FIG. 1). When the control valve 22 is opened air may flow from the pressure source 14 through a conduit 35 into a chamber 36 formed on one side of the valve seat 21. When the control valve 22 is opened, air under pressure may pass from the chamber 36 past the valve seat 21 into a chamber 37 formed on the lower side of the control piston 16. From the chamber 37, high pressure air is delivered to the brake actuating device 15 via a conduit 38.

In order to control the dumping of the valve actuating device 15 in the event of a skid condition, a solenoid valve indicated generally by the reference numeral 41 is provided. The solenoid valve 41 has a winding 42 that is in circuit with a control device, indicated schematically at 43, by means of a conductor 44. The control device 43 receives a signal from one or more of the wheels of the associated vehicle and when this signal indicates an impending skid condition, the control device 43 will energize the solenoid winding 42 to dump the brakes 15, in a manner which will be described.

The solenoid valve 41 includes a valve chamber 45 in which a magnetic valve plate 46 is supported for reciprocation. The valve plate 46 carries axially spaced valve portions 47 and 48 that selectively communicate with ports 49 and 51, respectively, formed at the end of conduits 52 and 53. A coil compression spring 54 is supported in a counterbore 55 formed adjacent the port 51 and urges the valve plate 46 to the position shown in FIG. 1. In this position, the port 49 is closed and the port 51 is opened.

The valve chamber 45 is in communication, on the lower side of the valve plate 46 with a conduit 56 that intersects a conduit 57 which, in turn, enters into the control chamber 34 of the relay valve 13. The conduit 52 is opened at its outer end to the atmosphere so as to dump the pressure in the control chamber 34 when the valve portion 47 is spaced from its respective port 49, as will become apparent.

The conduit 53 extends from the solenoid valve 41 into a chamber 61 of a regulator valve assembly, indicated generally by the reference numeral 62. The chamber 61 is defined by a regulator housing 63 and a diaphragm 64. The diaphragm 64 carries a regulator piston 65 having an upwardly extending portion 66 through which a restricted passage 67 is formed. A spring 68 engages the regulator piston 65 and establishes a predetermined force on the piston 65, for a reason which will be described.

The lower side of the regulator piston 65 and diaphragm 64 experiences the pressure in a chamber 69 in which the spring 68 is contained. The chamber 69 is in fluid communication with a memory volume 71 via a conduit 72. The memory volume 71 also communicates with pressure in the conduits 56 and 57 via a conduit 73 in which a restricted orifice 74 is formed. A further conduit 75 interconnects the memory volume 71 with the conduit 38. A restricted orifice 76 and check valve 77 are positioned in the conduit 75. The check valve 77 is oriented so as to permit flow from the memory volume 71 into the conduit 38 through the conduit 75 and to preclude flow in the reverse direction.

The regulator valve 62 includes a valve member 78 that is slidably supported in a bore 79 of the regulator housing 63. The valve member 78 has a head portion 81 that is smaller in diameter than the bore 79 so as to provide a flow passage when the valve member 78 is opened. A coil spring 82 engages the valve member head 81 and a snap ring 83 to normally urge the valve member 78 to a closed position. In this closed position, flow through a passage 84 formed in the regulator valve housing 63 at the base of the bore 79 is prevented.

A conduit 85 provides a source of air pressure from the treadle valve 12 to a chamber 86 positioned at the inlet side of the regulator valve assembly 62. The conduit 85 is also in communication with a chamber 87 of the latch valve assembly 26 via a conduit 88 in which a restricted orifice 89 is provided.

As has been noted, the detailed assembly views of the relay valve assembly (FIGS. 5 and 6) identify the components already described by the same reference numerals as those used in describing the schematic views (FIGS. 1 through 3). The valve assembly is comprised of three interconnected main pieces, a valve body 91 in which the relay valve piston 16 and control valve 22 and check valve 77 are located, a valve plate 92 in which certain passages are formed and a housing 93 that receives the coil 42 of the solenoid valve 41, the latch valve 26, the regulator assembly 62 and which defines the memory volume 71. The memory volume does not appear in FIGS. 5 and 6 but occupies a substantial portion of the generally hollow volume of the housing 93. The elements 91, 92, and 93 are held together by a plurality of bolts 94 that pass through the housing 93 and plate 92 and are threaded into appropriate tapped holes formed in the valve body 91.

OPERATION

FIG. 1 illustrates the brake system in the normal brake apply mode. In this condition the operator will have opened the treadle valve 12 and caused control pressure to be delivered through the conduit 25 to the under side of the latch valve 26 via the port 31. The latch valve 26 is normally held in an opened position by the spring 29 and control pressure passes through the conduit 33 to the control volume 34 positioned above the relay valve piston 16. The pressure acting on the upper side of the piston 16 urges it downwardly to close an internal port 101 formed in the control valve 22 and to urge the control valve portion 23 away from the valve seat 21. During this operation, the spring 24 is compressed. High pressure air may then flow from its source 14 through the conduit 35 into the chamber 36 and past the open valve seat 21. This air is delivered to the chamber 37 and passes from the conduit 38 to the brake actuating device 15. The high pressure in the chamber 37 holds the check valve 77 in a closed position.

During the aforedescribed operation the solenoid valve 41 will be held in its closed position by the spring 54 and communication of the conduit 56 with the atmosphere through the passage 52 will be precluded. The conduit 56 will communicate with the conduit 53 via the clearance which exists around the periphery of the valve plate 46. During brake operation, the memory volume 71 will be charged with air under pressure through the conduit 73 at a restricted rate dependent upon the size of the orifice 74. The regulator 62 will receive air under pressure through the conduit 53 and this pressure enters the chamber 61 to urge the diaphragm 64 downwardly. The memory volume 71 is then charged through the regulator passage 67 in the piston 65 at a less restricted rate. The pressure established in the chamber 71 will be related to the control pressure that exists during brake application.

If a signal is received at the control device 43 that indicates an impending skid condition, the solenoid valve 41 will be dumped to release the brakes (FIG. 2). When this happens, the coil 42 will be energized and the valve plate 46 drawn upwardly. This movement opens the port 49 and permits the air in the relay valve chamber 34 to be dumped to the atmosphere via the conduits 57,56, bore 45 and passage 52.

When the relay valve chamber 34 is dumped to atmospheric pressure, the reduced pressure is transmitted through the conduit 33 to the area of the latch valve 26 below the diaphragm 27. Full treadle valve control pressure will, however, still be experienced in the chamber 87 above the diaphragm 27 and this pressure will overcome the force of the spring 29. The latch valve 26 then moves downwardly to bring the valve 28 into closure with the port 31 and prevent further communication of treadle control pressure with the relay valve chamber 34.

When the relay valve chamber 34 is dumped, the spring 18 and the pressure in the chamber 37 from the brake actuating device 15 will urge the control piston 16 upwardly and will permit the control valve 22 to move so that its valve plate 23 engages the valve seat 21. Thus, the high pressure source 14 is prevented from communicating with the conduit 38 and brake actuating device 15.

Figure 5:
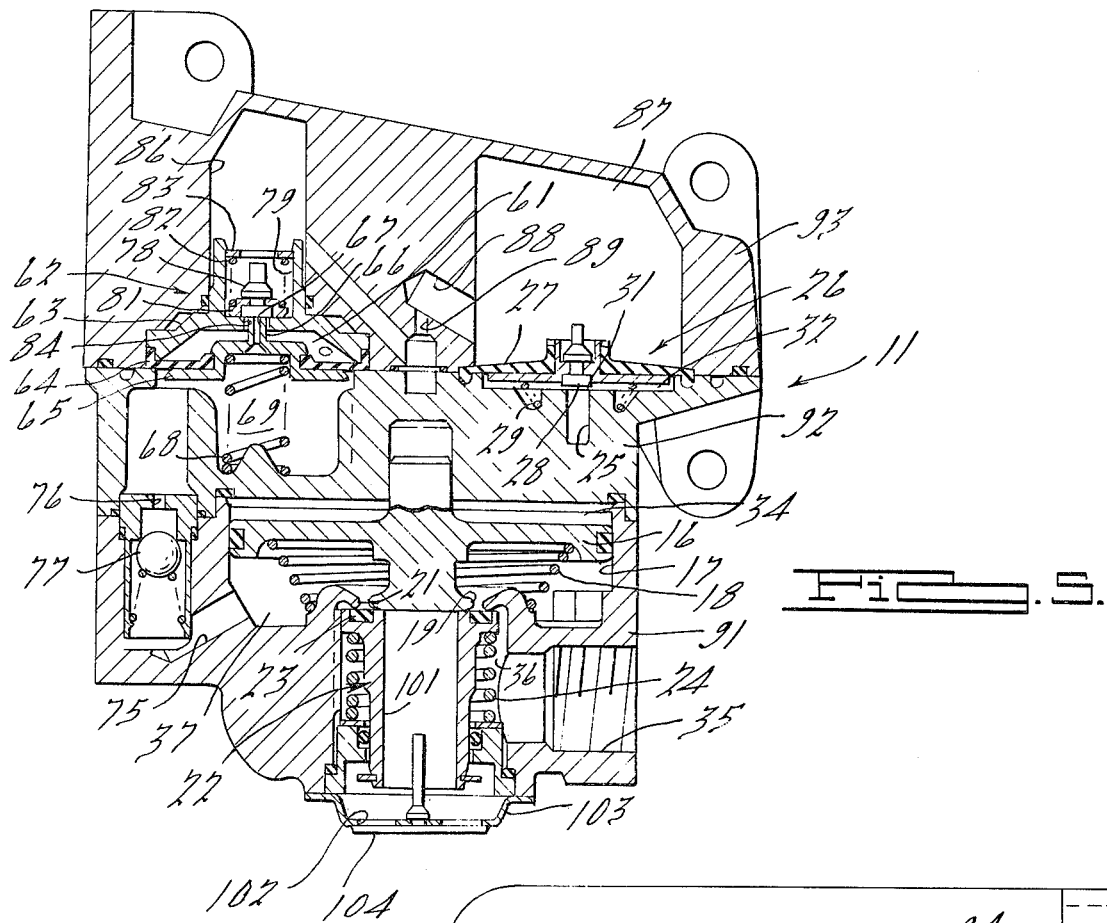
FIG. 5 is a cross sectional view of a relay valve embodying the skid control system shown schematically in FIGS. 1 through 3.
Figure 6:
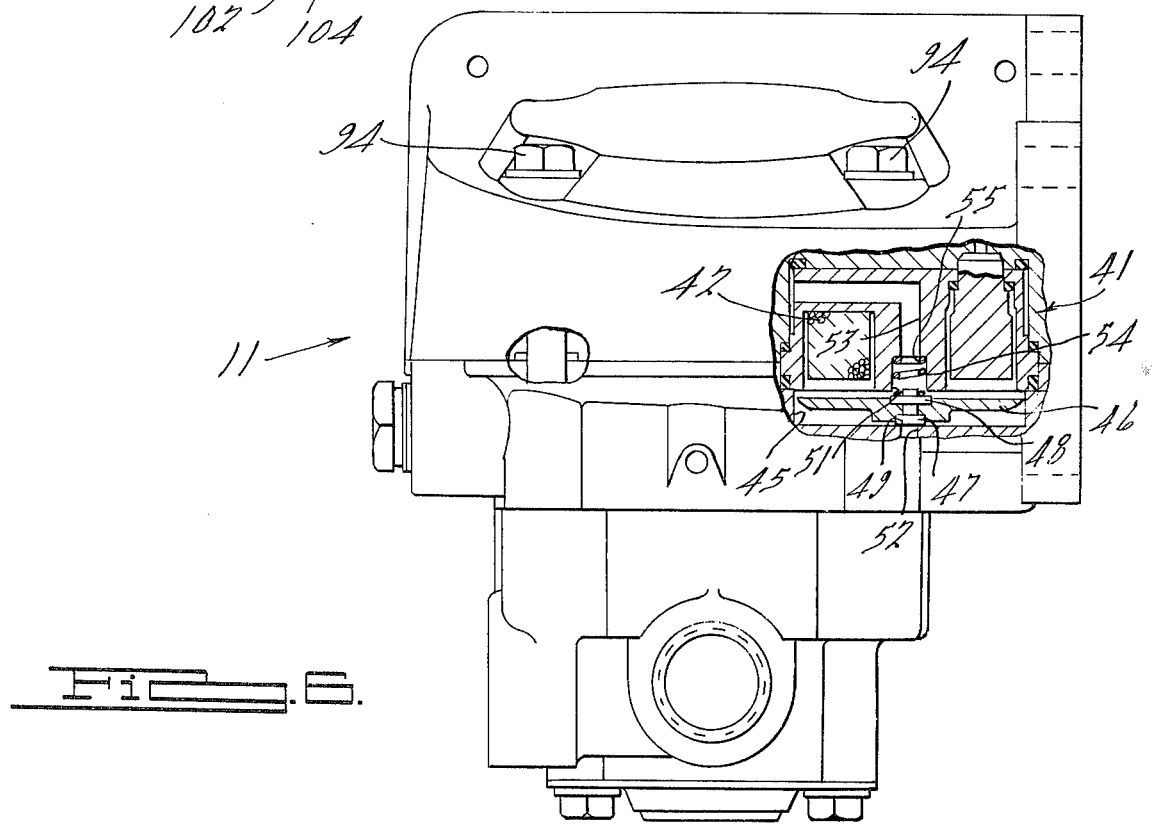
FIG. 6 is a side elevational view of the relay valve shown in FIG. 5, with portions broken away to more clearly show the construction.

As may be readily apparent from FIG. 2, the control piston 16 undergoes a greater degree of movement than does the control valve 22 and the control piston portion 19 will move away from its normal closure with the passage 101 that extends through the control valve 22. The conduit 38, therefore, communicates with the passage 101 and may be dumped to atmosphere through openings 102 formed in a cap member 103 that is secured to the lower side of the valve body 91 (FIG. 5). A flap type valve 104 will be deflected from its normal closed position to permit the relief of the air pressure from the brake actuating device 15 through the aforedescribed passages.

When the brakes are dumped, the pressure in the memory volume 71 will gradually bleed off through the conduits 73 and 75. The orifices 74 and 76 in these respective conduits determine the rate of decrease of pressure in the memory volume 71 during this cycle. The orifice 76 is considerably larger than the orifice 74 and the size of the orifice 76 primarily determines the rate of decrease of pressure in the memory volume 71. When the solenoid valve 41 is moved to its dumped position the valve portion 48 closes the port 51 and cuts off cummunication between the relay valve chamber 34 with the conduit 53 and the chamber 61 to the regulator.

When the wheel brake actuating device 15 is released, the associated wheel or wheels will be permitted to spin up and will eventually reach a condition in which the control device 43 determines that the brakes should be reapplied. Initial reapplication, assuming that the operator has continued to maintain the treadle valve 12 in an open position, will be accomplished via the circuit shown in FIG. 3. In this condition, the solenoid valve 41 is released by deenergization of the coil 42. The valve plate 46 is then urged by the spring 54 so that the valve portion 47 will close the port 49 and preclude further communication of the relay valve chamber 34 with the atmosphere. It should be noted that at this time the latch valve 26 will still be maintained in a closed position since the pressure in the chamber 87 will be greater than the pressure on the underside of the diaphragm 27.

Control pressure for subsequent reapplication is delivered to the relay valve chamber 34 via the regulator 62 during the reapplication cycle. The load of the spring 68 and the pressure remaining in the memory volume chamber 71 will determine the pressure at which the brakes are reapplied. In the preferred embodiment of the invention, the spring 68 provides a reapplication pressure that is approximately 10 psi greater than the pressure that exists in the memory volume 71. The reapplication pressure will be slightly less than the pressure that existed immediately prior to dumping of the brakes. The amount of decrease in the pressure will be determined by the amount of leakage that occurred through the orifices 76 and 74. Obviously, this pressure also will be determined by the length of time that the solenoid 41 was maintained in its energized state. Thus, the longer period of time necessary for the wheels to reach the point at which the brakes may be reapplied, the lower will be the reapplication pressure.

Upon reapplication, the pressure in chamber 61, maintained during the dump cycle by the regulator 62 at a pressure set by memory chamber pressure and spring 68, will be communicated to chamber 34 via open solenoid valve 48. Treadle valve pressure then flows from the conduit 85 into the chamber 86 past the open regulator valve 78 into the conduit 53. The valve portion 48 of the solenoid valve plate 46 will be opened and this pressure is transmitted around the periphery of the valve plate 46 through the conduits 56 and 57 to the relay valve chamber 34. The resulting pressure will urge the relay valve piston 16 downwardly to reopen the control valve 22. The brake actuating device 15 will be reactuated at a pressure that first rapidly rises to a predetermined pressure and subsequently rises at a reduced rate, as will become more apparent.

If the brake actuating device 15 continues to be actuated, regulated pressure, which is higher than the pressure in the memory volume 71, will cause a flow of control air through the conduit 73 and orifice 74 into the memory volume 71. Thus the pressure acting in the chamber 69 will continue to increase and will cause the regulator 62 to establish a gradually increasing control pressure via the solenoid valve 41 into the relay valve chamber 34. Thus, the brake actuating device 15 will be reapplied at a gradually increasing pressure. Eventually, the pressure exerted on the actuating device 15 may be sufficient to cause the associated wheel brakes to begin to lock up. If this condition exists, the control device 43 will again send a signal to the solenoid valve 41 to cause the brakes to be dumped. After the brake pressure has been relieved sufficiently, as sensed by the control device 43, the brakes will again be reapplied in the aforedescribed mode.

The described cycle of brake operation assumes that the operator maintains the treadle valve 12 in a brake applying position. Under this condition, the brake actuating device 15 will be sequentially applied and released as described during a single braking cycle. Under some conditions, the operator may wish to regain manual control of the brake actuating device 15. This may be conveniently done by releasing the treadle valve 12. When the treadle valve 12 is released, the control pressure in the conduits 25 and 85 will be relieved and the pressure will equalize on opposite sides of the latch valve diaphragm 27. When this occurs, the spring 29 will reopen the latch valve to the position shown in FIG. 1 and the vehicle operator may again operate the treadle valve 12 to manually apply the brakes.

Figure 4:
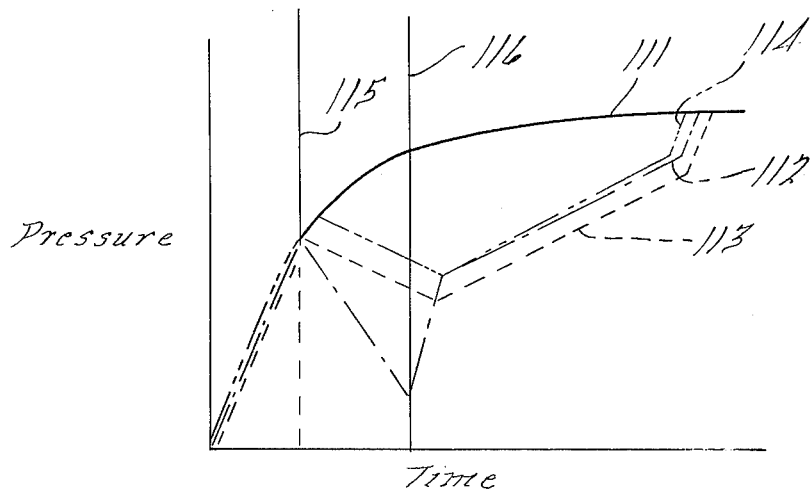
FIG. 4 is a graph showing the pressures in the brake system during a braking cycle.

FIG. 4 shows the relationship between the pressures in the various components during a brake operating cycle in relation to time. The pressure at the treadle valve 12 is represented by the solid line curve 111. The delivery pressure experienced in the conduit 35 and by the brake actuating device 15 is represented by the dot-dash curve 112. The pressure in the memory volume 71 is represented by the broken line curve 113. The pressure transmitted from the regulator 62 to the control chamber 34 of the relay valve 13 via the conduit 53 is identified by the dash-double dot line curve 114. All of the pressures of the curves 111, 112, 113, 114 follow each other at substantially the same value, except for the delay in build up pressure in the memory volume 71, (curve 113) until the time at which the solenoid valve 41 is energized to dump the brakes. This point in time is represented by the line 115 in FIG. 4. When the brakes are dumped, the delivery pressure will fall off rapidly as indicated by the curve 112. The pressures in the regulator and memory volume (curves 114 and 113) will fall off at a lesser rate and there will be a 10 psi offset between these two curves. When the pressure in the brake actuating device 15 is sufficient to indicate a need for reapplication of the brakes, the solenoid is deenergized and this point in time is represented by the line 116 of the graph of FIG. 4. At this point in time, the regulator 62 will try to reestablish a pressure in the brake actuating device 15 equivalent to a pressure 10 psi greater than the pressure in the memory volume 71. The brakes will be rapidly reapplied as indicated by the steep rise in the curve 112. This steep rise will continue until the delivery pressure reaches the regulator pressure. When this occurs, the delivery pressure will gradually be increased due to the leakage of air in the memory volume 71 through the orifice 74 to increase the pressure in the memory volume and that acting on the regulator 62. Assuming the control device 43 does not indicate the need for another brake release, the delivery pressure will continue to increase until the regulator pressure 114 approaches the treadle pressure within an amount set by the spring 29. At this time, the latch valve 26 will reopen and permit direct communication between the treadle valve 12 and the relay valve control chamber 34.

It should be readily apparent that the described construction provides an effective modulation of brake application pressure during a skid control cycle that reduces the likelihood of subsequent wheel lockups. The use of the regulator valve 62 in conjunction with memory volume 71 causes subsequent reapplications to be at a lower pressure than the pressure that existed during the time of original wheel lockup. The reapplication pressure is gradually increased until a subsequent lockup is experienced or until the vehicle is brought to a satisfactory stop.

The use of the regulator 62 in conjunction with the latch valve 26 also provides the modulated pressure even in the event the latch valve 26 should leak. If air from the treadle valve 12 leaks past the latch valve 26, the regulator 62 will operate to maintain the correct pressure in spite of the leak. Additionally, if the solenoid valve 47 should leak again, the regulator would operate to maintain correct pressure.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A vehicular anti skid braking system having brake applying means, an operator control for selectively applying actuating pressure to said brake applying means for actuating a vehicle brake, regulator means for providing a controlled supply of pressure of predetermined value, means responsive to an incipient skid condition for relieving the pressure in said brake applying means to prevent skidding, and means responsive to a predetermined condition for thereafter applying pressure at the predetermined value from said regulator means to said brake applying means for subsequent application of said brake applying means at a regulated pressure.

2. A vehicular anti skid braking system as set forth in claim 1 wherein the regulator means provides a gradually increasing application pressure during subsequent reapplications.

3. A vehicular anti skid braking system as set forth in claim 1 wherein the regulator means provides a pressure for reapplication that is related to the pressure that existed at the time of brake release.

4. A vehicular anti skid braking system as set forth in claim 1 wherein the regulator means provides a regulated pressure that is dependent upon the time interval between the point of brake release and the point of reapplication.

5. A vehicular anti skid braking system as set forth in claim 4 wherein the regulator means provides a pressure for reapplication that is related to the pressure that existed at the time of brake release.

6. A vehicular anti skid braking system as set forth in claim 1 further including latch valve means interposed between the operator control and the brake applying means for isolating the operator control from the brake applying means in response to an incipient skid condition.

7. A vehicular anti skid braking system as set forth in claim 6 wherein the latch valve is comprised of a first chamber responsive to the pressure in the brake applying means, a second chamber responsive to the pressure of the operator control and a movable member subjected to said pressures.

8. A vehicular anti skid braking system as set forth in claim 6 wherein the regulator receives operating fluid from the operator control.

9. A vehicular anti skid braking system as set forth in claim 8 wherein the regulator means provides a pressure for reapplication that is related to the pressure that existed at the time of brake release.

10. A vehicular anti skid braking system as set forth in claim 9 wherein the regulator means provides a gradually increasing application pressure during subsequent reapplications.

11. A vehicular anti skid braking system as set forth in claim 9 wherein the regulator means provides a regulated pressure that is dependent upon the time interval between the point of brake release and the point of reapplication.

12. A vehicular anti skid braking system as set forth in claim 1 wherein the brake applying means includes a relay valve, the means for relieving the pressure in the relay valve comprising a solenoid valve adapted, when actuated, to dump the pressure in said relay valve.

13. A vehicular anti skid braking system as set forth in claim 12 wherein the regulator means provides a gradually increasing application pressure during subsequent reapplications.

14. A vehicular anti skid braking system as set forth in claim 12 wherein the regulator means provides a pressure for reapplication that is related to the pressure that existed at the time of brake release.

15. A vehicular anti skid braking system as set forth in claim 12 wherein the regulator means provides a regulated pressure that is dependent upon the time interval between the point of brake release and the point of reapplication.

16. A vehicular anti skid braking system as set forth in claim 15 wherein the regulator means provides a pressure for reapplication that is related to the pressure that existed at the time of brake release.

17. A vehicular anti skid braking system as set forth in claim 12 wherein the regulator means includes a regulator valve and a memory volume for establishing the regulated pressure of said regulator valve, said memory volume being in fluid connection with said relay valve.

18. A vehicular anti skid braking system as set forth in claim 17 further including a restricted passage extending from the memory volume for permitting the pressure in said memory volume to decrease during the brake release cycle to reduce the pressure established in the regulator valve in relation to the time of brake release.

19. A vehicular anti skid braking system as set forth in claim 12 further including latch valve means interposed between the operator control and the brake applying means for isolating the operator control from the brake applying means in response to an incipient skid condition.

20. A vehicular anti skid braking system as set forth in claim 19 wherein the latch valve is comprised of a first chamber responsive to the pressure in the brake applying means, a second chamber responsive to the pressure of the operator control and a movable member subjected to said pressures.

21. A vehicular anti skid braking system as set forth in claim 19 wherein the regulator means includes a regulator valve and a memory volume for establishing the regulated pressure of said regulator valve, said memory volume being in fluid connection with said relay valve.

22. A vehicular anti skid braking system as set forth in claim 21 further including a restricted passage extending from the memory volume for permitting the pressure in said memory volume to decrease during the brake release cycle to reduce the pressure established in the regulator valve in relation to the time of brake release.

23. A vehicular anti skid braking system as set forth in claim 17 further including a restricted passageway extending between the memory volume and the relay valve for providing a slowly rising pressure in the memory volume upon brake application.

24. A vehicular anti skid braking system as set forth in claim 22 further including a restricted passageway extending between the memory volume and the relay valve for providing a slowly rising pressure in the memory volume upon brake application.

* * * * *